(12) United States Patent
Piehl et al.

(10) Patent No.: US 8,764,038 B2
(45) Date of Patent: Jul. 1, 2014

(54) HEAVY-DUTY AXLE/SUSPENSION SYSTEM

(71) Applicant: Hendrickson USA, L.L.C., Itasca, IL (US)

(72) Inventors: Daniel J. Piehl, Mitchell, SD (US); Kevin J. Erdmann, Mitchell, SD (US)

(73) Assignee: Hendrickson USA, L.L.C., Itasca, IL (US)

( * ) Notice: Subject to any disclaimer, the term of this patent is extended or adjusted under 35 U.S.C. 154(b) by 0 days.

(21) Appl. No.: 14/027,702

(22) Filed: Sep. 16, 2013

(65) Prior Publication Data
US 2014/0077472 A1   Mar. 20, 2014

Related U.S. Application Data

(60) Provisional application No. 61/701,835, filed on Sep. 17, 2012.

(51) Int. Cl.
*B60G 3/14*   (2006.01)
*B60G 9/02*   (2006.01)
*B60G 9/00*   (2006.01)
*B60G 11/27*  (2006.01)

(52) U.S. Cl.
CPC ............... *B60G 9/003* (2013.01); *B60G 11/27* (2013.01); *B60G 2204/148* (2013.01); *B60G 2204/43* (2013.01); *B60G 2206/8201* (2013.01)
USPC ............................ 280/124.116; 280/124.128

(58) Field of Classification Search
CPC ........ B60G 9/003; B60G 9/006; B60G 11/27; B60G 2204/143; B60G 2204/148; B60G 2204/43; B60G 2204/44; B60G 2204/4404; B60G 2206/8201; B60G 2206/82013; B60G 2206/82014
USPC ..................... 280/124.116, 124.128, 124.153
See application file for complete search history.

(56) References Cited

U.S. PATENT DOCUMENTS

| | | | |
|---|---|---|---|
| 2,367,817 A | 1/1945 | Brown | |
| 2,879,077 A | 3/1959 | Chalmers | |
| 4,261,597 A * | 4/1981 | Vandenberg | 280/86.75 |
| 4,293,145 A | 10/1981 | Taylor | |
| 4,501,437 A | 2/1985 | Becker | |
| 4,566,719 A | 1/1986 | Van Denberg | |
| 4,615,539 A | 10/1986 | Pierce | |
| 4,722,549 A | 2/1988 | Raidel | |
| 5,037,126 A * | 8/1991 | Gottschalk et al. | 280/124.116 |
| 5,112,078 A * | 5/1992 | Galazin et al. | 280/124.116 |
| 5,366,237 A | 11/1994 | Dilling et al. | |
| 5,639,110 A | 6/1997 | Pierce et al. | |
| 5,690,353 A | 11/1997 | Vandenberg | |
| 6,508,482 B2 * | 1/2003 | Pierce et al. | 280/124.116 |
| 7,854,438 B2 * | 12/2010 | Richardson | 280/124.116 |
| 8,292,313 B2 * | 10/2012 | Pierce et al. | 280/124.11 |
| 8,490,989 B2 * | 7/2013 | Piehl et al. | 280/124.11 |
| 8,528,923 B2 * | 9/2013 | Wakefield et al. | 280/124.116 |
| 2004/0232646 A1 | 11/2004 | Peters et al. | |
| 2005/0051986 A1 * | 3/2005 | Galazin et al. | 280/124.116 |
| 2007/0114215 A1 | 5/2007 | Bill | |
| 2007/0145704 A1 * | 6/2007 | Chan et al. | 280/124.116 |
| 2011/0095501 A1 | 4/2011 | Piehl et al. | |

* cited by examiner

*Primary Examiner* — Drew Brown
(74) *Attorney, Agent, or Firm* — Dureska, Kennedy & Moore, L.L.C.; David P. Dureska; Brent L. Moore

(57) ABSTRACT

An axle seat bracket-to-beam connection for a heavy-duty axle/suspension system includes at least a pair of spaced apart weld stops that are attached to a beam of a suspension assembly of the axle/suspension system. A weld is laid along an interface between the axle seat bracket and the beam between the pair of weld stops.

11 Claims, 17 Drawing Sheets

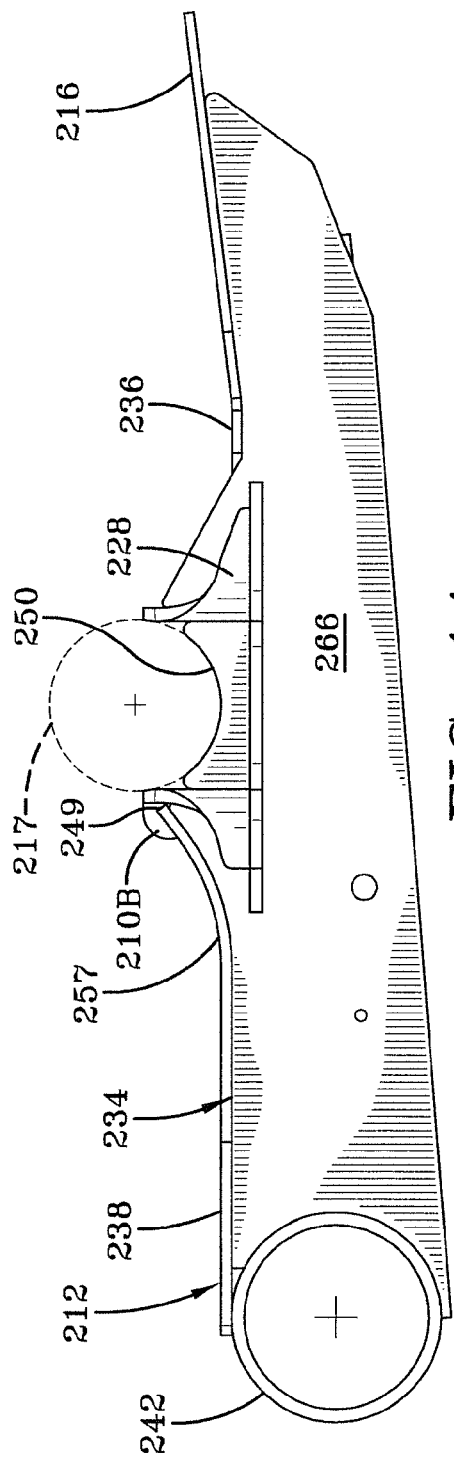
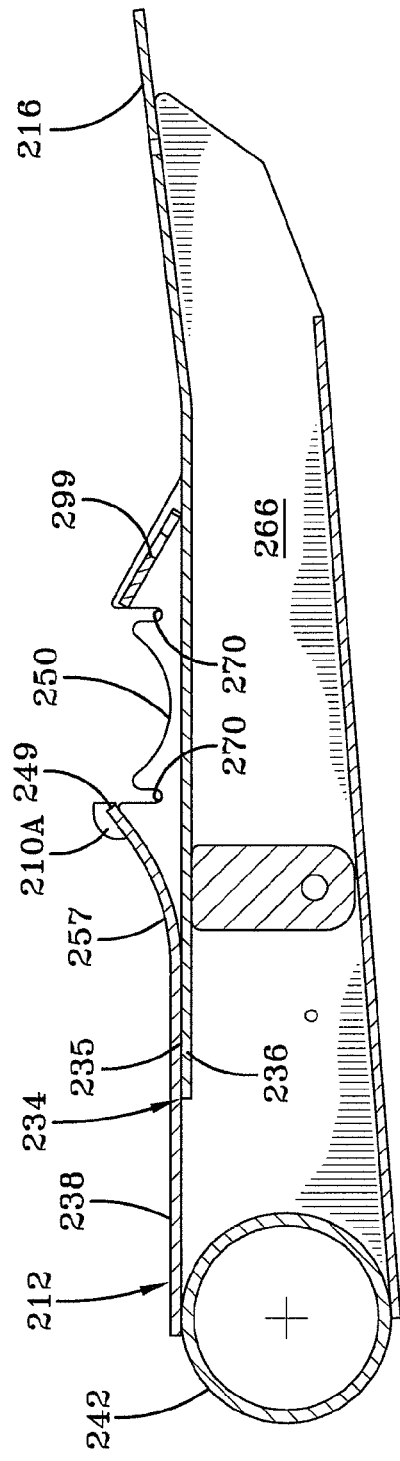
FIG-11
FIG-12

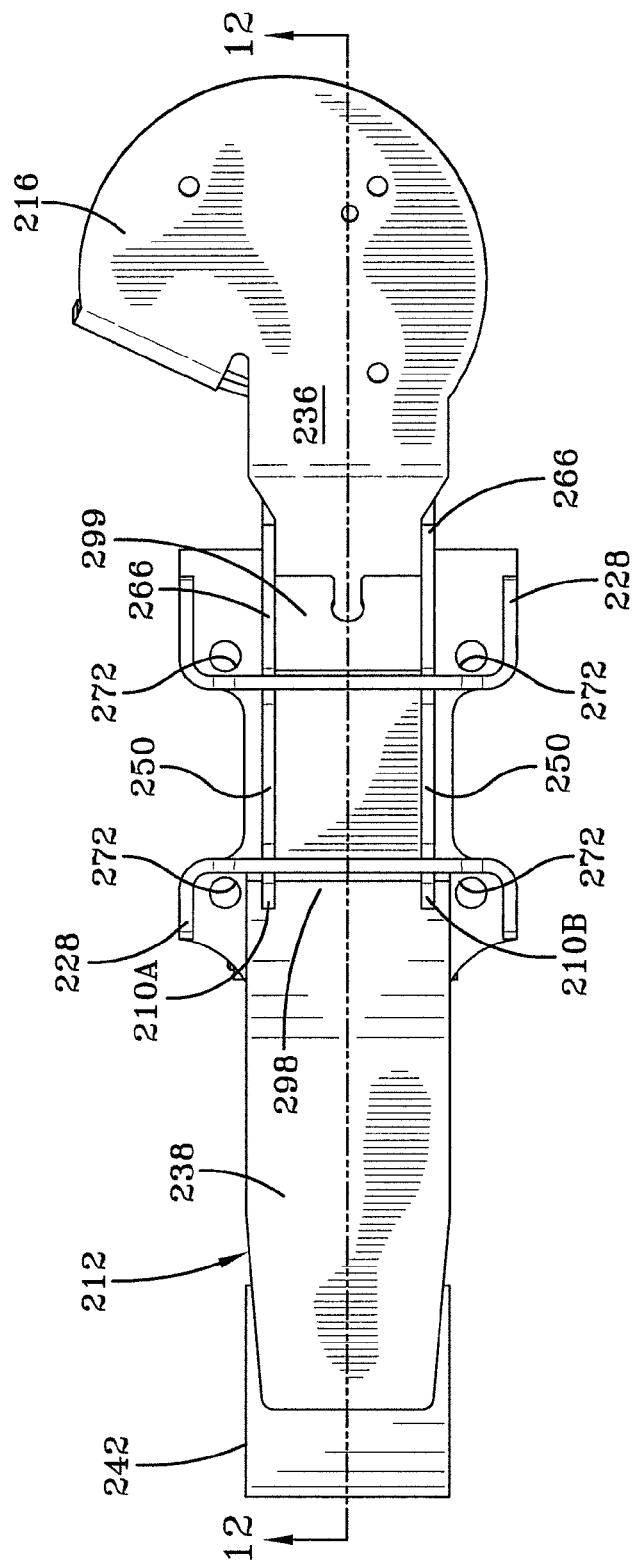
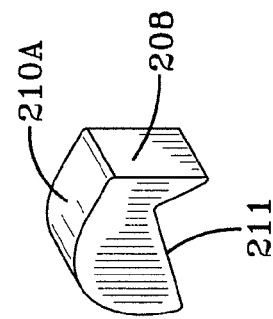
FIG-14
FIG-15

HEAVY-DUTY AXLE/SUSPENSION SYSTEM

CROSS-REFERENCE TO RELATED APPLICATION

This application claims the benefit of U.S. Provisional Patent Application Ser. No. 61/701,835, filed Sep. 17, 2012.

BACKGROUND OF THE INVENTION

1. Field of the Invention

The invention relates generally to axle/suspension systems and, in particular, to the suspension assemblies of those systems, which are useful for heavy-duty vehicles such as trucks and tractor-trailers. More particularly, the invention is directed to a heavy-duty trailing or leading arm rigid beam-type suspension assembly for trucks and tractor-trailers, in which the beams securely and efficiently capture the axle. More specifically, the invention is directed to an improved axle seat bracket-to-beam connection, which generally includes a pair of transversely aligned and spaced-apart weld stops attached to and/or formed on the beam of the suspension assembly adjacent the axle seat bracket. These weld stops serve as guides for starting and/or stopping the welds between the beam and the axle seat bracket and provide for a more robust axle seat bracket-to-beam connection, resulting in improved durability of the axle/suspension system.

2. Background Art

The use of air-ride trailing and leading arm rigid beam-type axle/suspension systems has been very popular in the heavy-duty truck and tractor-trailer industry for many years. Air-ride trailing and leading arm spring beam-type axle/suspension systems also are often used in the industry. Although such axle/suspension systems can be found in widely varying structural forms, in general their structure is similar in that each system typically includes a pair of suspension assemblies. In some heavy-duty vehicles, the suspension assemblies are connected directly to the primary frame of the vehicle. In other heavy-duty vehicles, the primary frame of the vehicle supports a subframe, and the suspension assemblies connect directly to the subframe. For those heavy-duty vehicles that support a subframe, the subframe can be non-moveable or moveable, the latter being commonly referred to as a slider box, slider subframe, slider undercarriage, or secondary slider frame. For the purpose of convenience and clarity, reference herein will be made to a slider box, with the understanding that such reference is by way of example, and that the present invention applies to heavy-duty vehicle axle/suspension systems suspended from primary frames, moveable subframes, and non-movable subframes.

Specifically, each suspension assembly of an axle/suspension system includes a longitudinally extending elongated beam. Each beam is located adjacent to and below a respective one of a pair of spaced-apart longitudinally extending main members of the slider box. More specifically, each beam is pivotally connected at one of its ends to a hanger, which in turn is attached to and depends from a respective one of the main members of the vehicle. An axle extends transversely between and typically is connected by some means to the beams of the pair of suspension assemblies at a selected location from about the mid-point of each beam to the end of the beam opposite from its pivotal connection end. The opposite end of each beam also is connected to a bellows air spring or its equivalent, which in turn is connected to a respective one of the frame main members. A brake assembly and shock absorber also are mounted on each of the beams and/or axle. A height control valve is mounted on the hanger and is operatively connected to the beam in order to maintain the ride height of the vehicle. The beam may extend rearwardly or frontwardly from the pivotal connection relative to the front of the vehicle, thus defining what are typically referred to as trailing arm or leading arm axle/suspension systems, respectively. However, for purposes of the description contained herein, it is understood that the term "trailing arm" will encompass beams, which extend either rearwardly or frontwardly with respect to the front end of the vehicle.

The beam on which the axle is mounted is typically either a top-mount/overslung beam or a bottom-mount/underslung beam. An axle is mounted on the top of and is supported by the bottom-mount/underslung beam-type, with generally an upper portion of the axle being exposed. Conversely, an axle is mounted on the bottom of a top-mount/overslung beam, with generally a lower portion of the axle being exposed. Axle-to-beam mounts are typically fortified in some manner to maintain the mount integrity and prevent separation of the axle from the beams. Such fortification usually includes additional mounting hardware such as U-bolts, U-bolt brackets, and the like, resulting in a secure axle-to-beam connection more capable of withstanding operational loads.

More particularly, the axle seat typically is formed in each beam by nesting a front axle seat bracket into a pair of transversely-aligned grooves formed in the opposing sidewalls of the beam adjacent the front edge of the aligned arches formed in the beam sidewalls. A rear axle seat bracket is nested into a pair of transversely-aligned grooves formed in opposing sidewalls of the beam adjacent the rear edge of the aligned arches formed in the beam sidewalls. The front axle seat bracket is rigidly attached to the beam via welds laid along the edge of the axle seat bracket and the first top plate of the beam. The rear axle seat bracket is rigidly attached to the beam via welds laid along the edge of the axle seat bracket and the second top plate of the beam. In this manner, the front and rear axle seat brackets along with the aligned arches formed in the sidewalls of the beam form an axle locus for placement of the axle.

The welded connections of the axle seat brackets to the beam are subjected to high stresses during operation of the heavy-duty vehicle. These stresses can be especially pronounced for extreme-duty vehicles, such as those that are rated at about 30,000 lbs. per axle or more. Under these conditions, the welded connection of the front axle seat bracket can potentially become compromised or become weakened during vehicle operation, resulting in reduced durability of the axle seat bracket-to-beam connection and, in turn, reducing the durability of the axle-to-beam connection of the axle/suspension system.

Therefore, a need exists in the art for an improved axle seat bracket-to beam connection for axle/suspension systems, which utilizes a pair of weld stops located adjacent to the axle seat bracket-to-beam connection to fortify the axle seat bracket-to-beam connection. The welds stops provide both a start and a stop point for welding the axle seat bracket to the beam, thereby providing a more robust axle seat bracket-to-beam connection, resulting in improved overall durability of the axle/suspension system.

SUMMARY OF THE INVENTION

Objectives of the present invention include providing a heavy-duty axle/suspension system that fortifies the axle seat bracket-to-beam connection.

A further objective of the present invention is to provide a heavy-duty axle/suspension system that has a more robust axle seat bracket-to-beam connection.

Yet another objective of the present invention is to provide a heavy-duty axle/suspension system that has improved overall durability.

These objectives and advantages are obtained by the axle seat bracket-to-beam connection for a heavy-duty axle/suspension system, which includes at least a pair of spaced apart weld stops. Each one of the weld stops attached to at least one of a beam or an axle seat bracket of a suspension assembly of the axle/suspension system. A weld is disposed along an interface between the axle seat bracket and the beam between the pair of weld stops.

BRIEF DESCRIPTION OF THE SEVERAL VIEWS OF THE DRAWINGS

The preferred embodiment of the present invention, illustrative of the best mode in which applicants have contemplated applying the principles, is set forth in the following description and is shown in the drawings, and is particularly and distinctly pointed out and set forth in the appended claims.

FIG. 11 is a side elevational view looking inboard of the beam shown in FIG. 10;

FIG. 12 is a sectional elevational view of the beam shown in FIG. 10;

FIG. 14 is a top view of the beam shown in FIG. 10; and

FIG. 15 is a greatly enlarged perspective view of the weld stop shown in FIG. 10.

Similar numerals refer to similar parts throughout the drawings.

DESCRIPTION OF THE PREFERRED EMBODIMENT

So that the environment in which the new and improved axle-to-beam connection of the present invention is utilized can be best understood, two axle/suspension systems are described immediately below, one which incorporates a prior art overslung/top-mount beam configuration and the other which incorporates a prior art underslung/bottom-mount beam configuration, both of which use axle-to-beam connection structures and methods including welds, U-bolts, axle seat brackets and their associated hardware, and conventional prior art axle seat bracket-to-beam connections.

Figure 1:
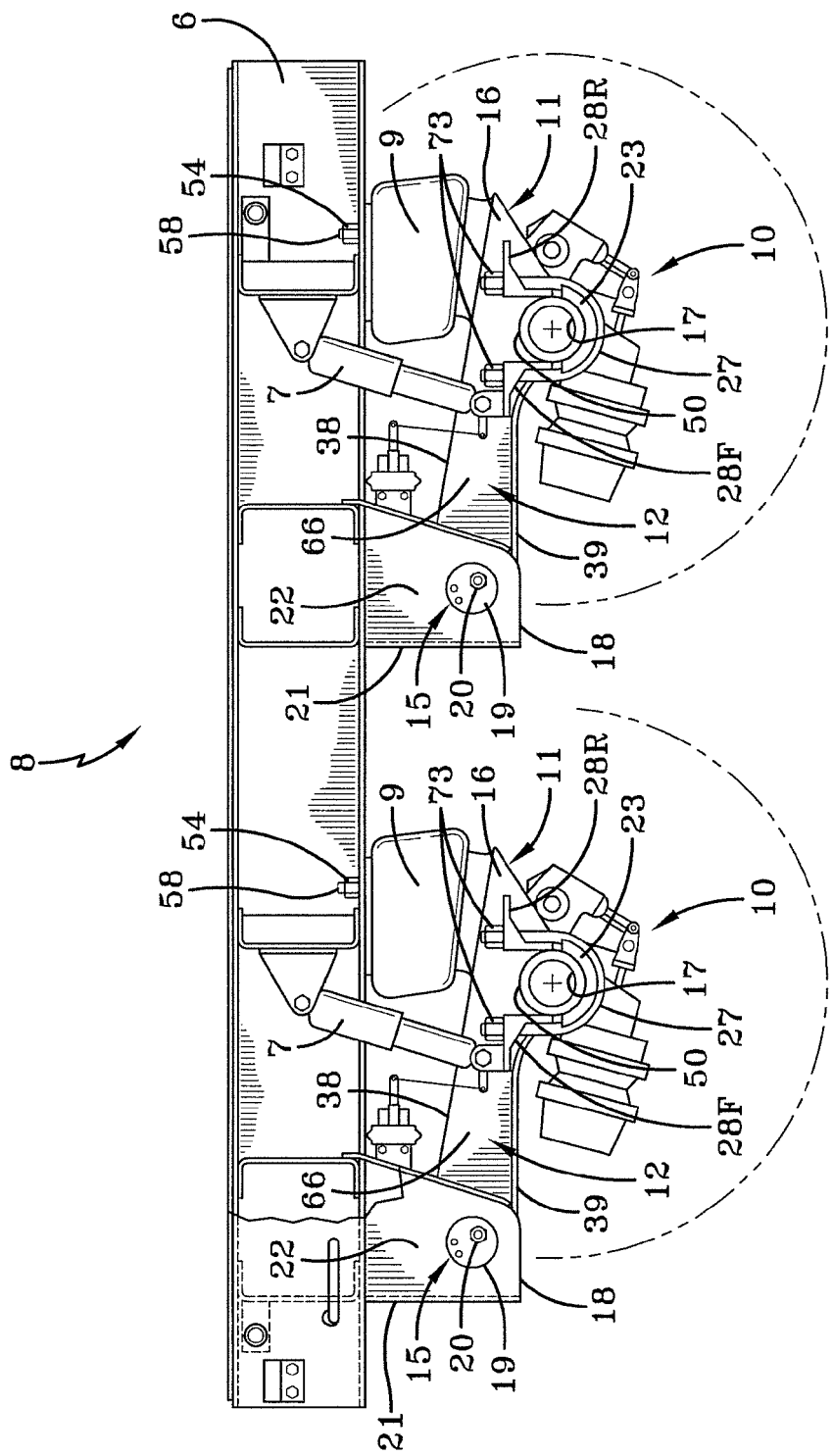
FIG. 1 is a fragmentary side elevational view of a slider box for a tractor-trailer incorporating front and rear prior art trailing arm air-ride beam-type suspension assemblies for a respective front and rear axle/suspension system, showing the overslung/top-mount beams of each suspension assembly capturing an axle utilizing axle-to-beam connections including welds (not shown), U-bolts, and axle seat brackets.

A pair of prior art air-ride trailing arm rigid overslung/top-mount air-ride beam-type axle/suspension systems are each indicated generally by reference numeral 10 and are shown in FIG. 1 incorporated into a slider box 8 of a tractor-trailer.

Axle/suspension system 10 is the subject of U.S. Pat. No. 5,037,126, is available from the assignee of the present invention, and is commercially sold as the HT Series Suspension System. Inasmuch as slider box 8 includes an identical pair of axle/suspension systems 10 mounted on the slider, only one of the axle/suspension systems will be described herein. Moreover, inasmuch as axle/suspension system 10 comprises an identical pair of suspension assemblies 11 mounted on a pair of transversely spaced frame hangers 18 depending from slider box 8 for mounting an axle 17, only one of the suspension assemblies will be described herein.

Figure 2:
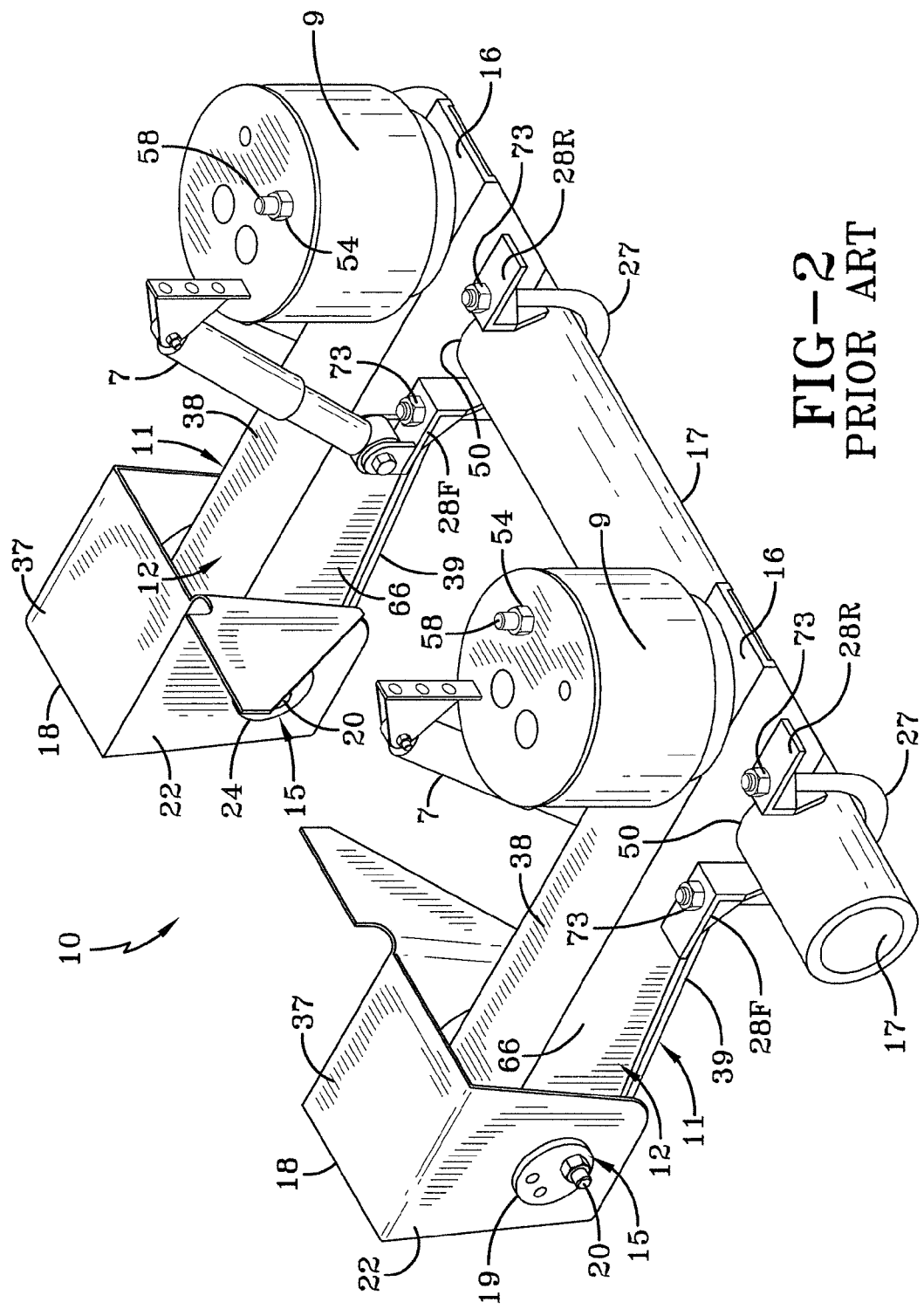
FIG. 2 is a top rear driver-side perspective view of one of the prior art axle/suspension systems shown in FIG. 1 pivotally attached to a pair of hangers, showing each of the overslung/top-mount beams capturing the axle utilizing axle-to-beam connections including welds (not shown), U-bolts and axle seat brackets.
Figure 2A:
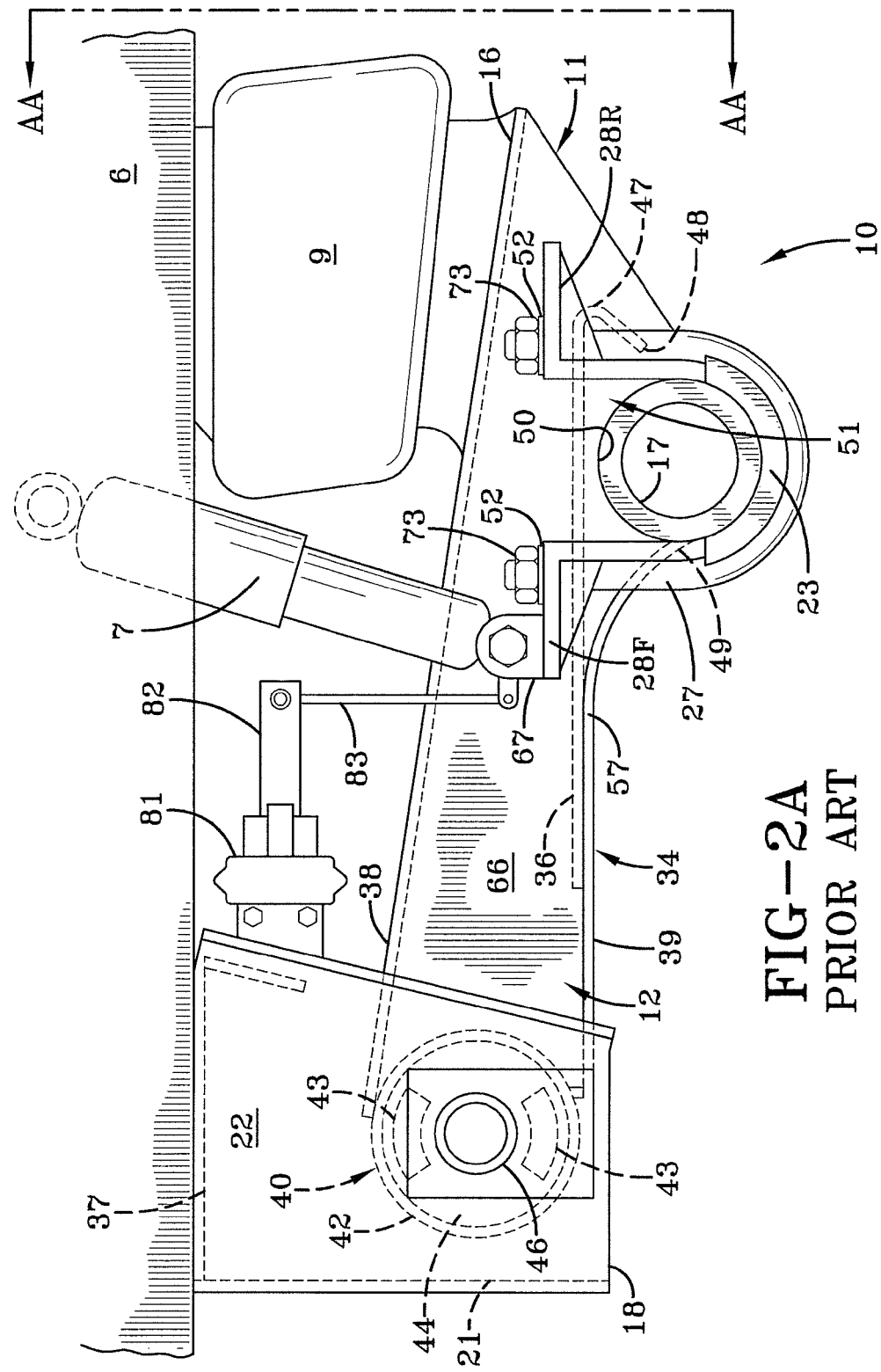
FIG. 2A is a fragmentary side elevational view looking in an outboard direction, with hidden portions represented by broken lines, of the prior art axle/suspension system shown in FIG. 2, showing a curb-side suspension assembly mounted on a vehicle frame and showing the overslung/top-mount beam capturing the axle utilizing axle-to-beam connections including welds (not shown), U-bolts, and axle seat brackets.

With additional reference to FIGS. 2 and 2A, suspension assembly 11 includes a trailing arm or beam 12 which is a generally rigid metal box-like structure comprising a pair of transversely spaced vertically extending sidewalls 66, which are interconnected by horizontally extending top and bottom plates 38 and 39, respectively. Sidewalls 66 and top plate 38 are formed as a one-piece structure having a generally inverted U-shape. Bottom plate 39 is welded to sidewalls 66 to complete the general structure of beam 12. A more detailed description of beam 12 is set forth below. The front end of beam 12 includes a bushing assembly 40 (FIG. 2A) of a type which is well known in the heavy-duty axle/suspension system art. The bushing assembly includes a mounting tube 42 formed of robust steel and an elastomeric bushing 44 press fit into the tube. The bushing 44 is molded about and adhesively attached to a central metal sleeve 46 formed with a continuous opening 56. Sleeve 46 passes completely through bushing 44 and extends outwardly from the sidewalls thereof to facilitate pivotal mounting of beam 12 on slider box 8, which will be described in greater detail hereinbelow. As is well known in the art, the durometer of elastomeric bushing 44 can be varied depending on the application and the bushing deflection properties desired. To generally achieve a softer ride in the vertical direction and a stiffer ride in the fore-aft direction, bushing 44 is formed with a pair of vertically-spaced voids 43 in each of its sidewalls.

A platform 16 extends from the rear end of trailing beam 12 for supporting a conventional bellows-type air spring 9, which extends between and is attached to platform 16 and a main member 6 of slider 8 (FIGS. 1 and 2A). A shock absorber 7 also is attached to and extends between beam 12 and main member 6 of slider box 8 at selected locations to complete the major components of suspension assembly 11. Axle 17 extends between and is rigidly connected to the rear end of each beam 12 by welds (not shown) and by structural components including a pair of U-bolts 27 and a pair of front and rear axle seat brackets 28F and 28R, respectively, as will be described in greater detail below. Front and rear axle seat brackets 28F,R are connected to inboard and outboard sidewalls 66 of beam 12 by conventional means such as welding.

Suspension assembly beam 12 is pivotally mounted on main member 6 of slider box 8 via frame hanger 18, which depends from and is secured to the main member by any conventional means such as welds. Frame hanger 18 typically is a generally box-like sturdy steel structure having a vertically extending front wall 21 and a top wall 37, which are each attached to and extend between a pair of vertically extending sidewalls 22 (FIGS. 2-2A). A fastener assembly 15 (FIGS. 1 and 2) includes a bolt 20 which passes through an eccentric washer 19 and a washer 24, with the eccentric washer being located adjacent the outboard surface of outboard sidewall 22 of hanger 18 and washer 24 being located adjacent the inboard surface of inboard sidewall 22 of the hanger, a pair of aligned openings (not shown) formed in hanger sidewalls 22, a pair of aligned openings formed in a pair of conventional spacer discs (not shown), and aligned continuous opening 56 of bushing sleeve 46. Each spacer disc typically is formed of ultra-high molecular weight polyethylene, and is disposed about bushing mounting tube 42 between a respective one of hanger sidewalls 22 and bushing 44, to insulate against metal-to-metal contact between the mounting tube and the hanger sidewalls. Eccentric washer 19 provides a means for adjusting alignment of axle/suspension system 10.

Figure 2B:
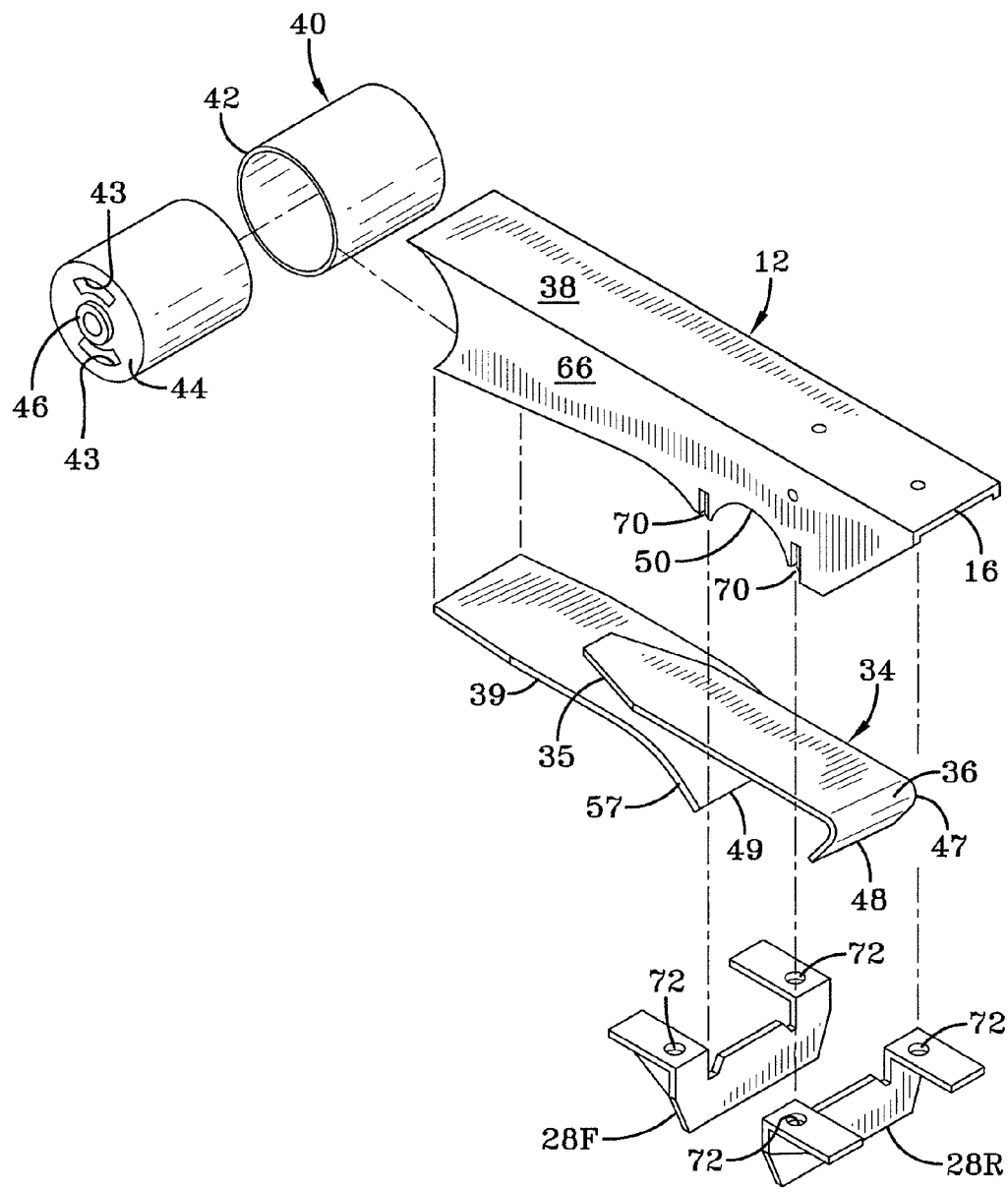
FIG. 2B is an exploded rear perspective view of the component parts of the beam construction of the suspension assembly shown in FIG. 2A, and showing the axle seat bracket and the component parts of the overslung/top-mount beam.
Figure 2C:
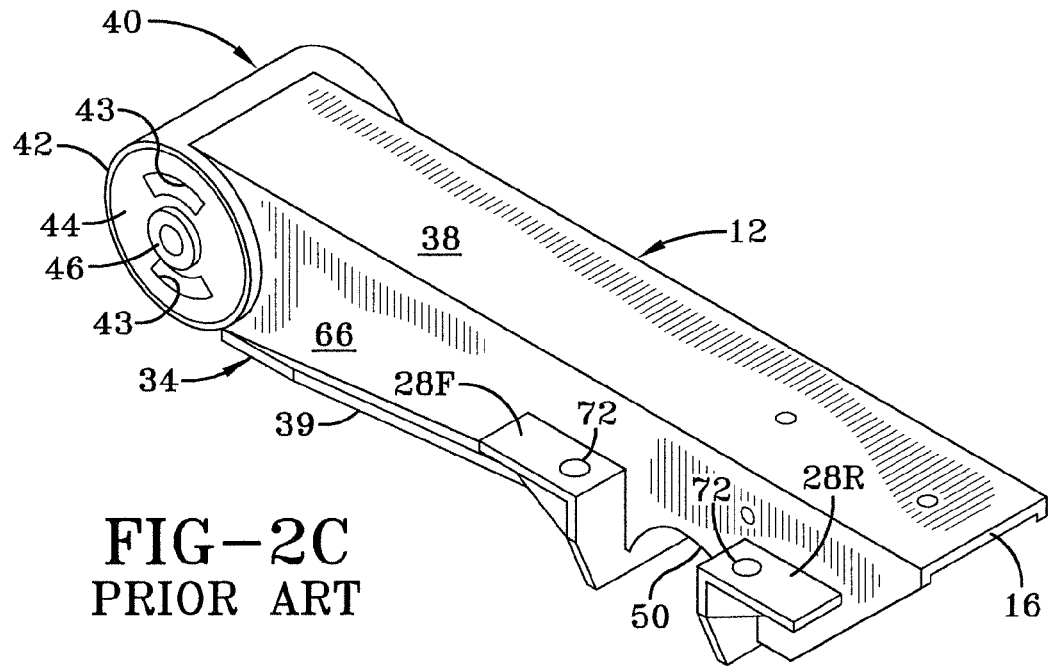
FIG. 2C is a rear perspective view of the assembled component parts shown in FIG. 2B.
Figure 2D:
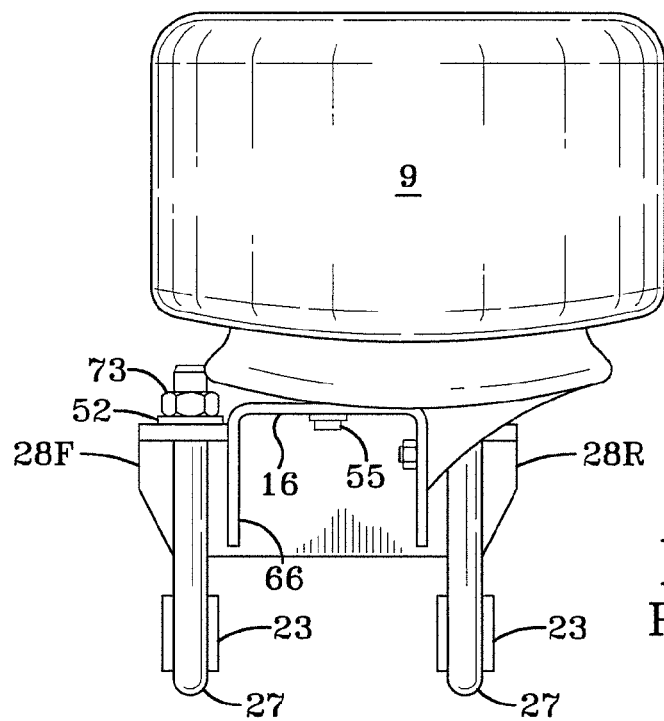
FIG. 2D is an end view, taken along line A-A of FIG. 2A of one of the pair of suspension assemblies, showing the overslung/top-mount beam with the axle removed, utilizing axle-to-beam connections including welds (not shown), U-bolts, and axle seat brackets.

Turning now to FIGS. 2B, 2C and 2D, beam 12 generally comprises seven component parts, including sidewalls 66, integral top plate 38, first bottom plate 39, a second bottom plate 36, and front and rear axle seat brackets 28F,R. As set forth above, opposing sidewalls 66 and top plate 38 form a one-piece generally inverted U-shaped member. This U-shaped member is formed by a stamping and/or bending process. First bottom plate 39 and second bottom plate 36 are secured together by welding along an adjacent interface 35 to form a rigid beam bottom member 34. Beam bottom member 34 is rigidly secured to the open end of the U-shaped member, and along sidewalls 66 and, thus, opposite and spaced from top plate 38.

Front and rear axle seat brackets 28F,R nest in and are rigidly secured to a pair of grooves 70 formed in opposing sidewalls 66 of beam 12, by welding. An arch 50 (only one shown) is formed in the lower edge of each of sidewalls 66 between grooves 70. Second bottom plate 36 is formed with a bend 47 adjacent an end 48 opposite from the bushing assembly end of the plate. First bottom plate 39 is also formed with a bend 57 adjacent an end 49 opposite from the bushing assembly end of the plate. Terminal bent end 48 of second bottom plate 36 contacts and is rigidly secured to rear axle seat bracket 28R by welding, while terminal bent end 49 of first bottom plate 39 contacts and is rigidly secured to front axle seat bracket 28F by welding. As can be seen, by bending first bottom plate 39 and second bottom plate 36 in a manner so that ends 49 and 48 are oriented in the general direction of axle 17 at substantially the same relative angles, an axle locus 51 (FIG. 2A) is formed between arches 50 (only one shown) of sidewalls 66, front and rear axle seat brackets 28F,R and ends 49 and 48 of first and second bottom plates 39 and 36, respectively.

Because the prior art axle-to beam connection requires a pair of generally identical inboard and outboard connections for each suspension assembly 11, for purposes of clarity only the inboard connection of the suspension assembly will be described with the understanding that an identical outboard connection also exists for the same suspension assembly. A U-bolt spacer 23 (FIG. 2A) is constructed such that it will contact an exposed lower portion of axle 17 and is disposed between the axle and U-bolt 27 to ensure a secure mating of the axle in locus 51. U-bolt 27 is placed around axle 17 and U-bolt spacer 23 (FIG. 2A) and through one of a pair of openings 72 formed in each one of front and rear axle seat brackets 28F,R. Each one of a pair of washers 52 (FIG. 2D) is disposed over a respective one of the pair of ends of U-bolt 27 and each one of a pair of nuts 73 is threadably engaged with a respective one of the pair of threaded ends of the U-bolt, and tightened. U-bolts 27 and their associated hardware, in addition to the welds (not shown) disposed between front and rear axle seat brackets 28F,R and axle 17, secure the axle into axle locus 51 to create a rigid axle-to-beam connection.

As shown in FIG. 2A, a shock absorber pivot plate 67 is secured to front axle seat bracket 28F by suitable means (not shown). Shock absorber 7 is fastened to shock absorber pivot plate 67 such that the shock absorber pivots relative to beam 12. A height control valve 81 is attached to hanger 18 and is operatively connected to shock absorber pivot plate 67, via a lever 82 and a link 83. Air bag 9 is secured to main member 6 of slider box 8 by threaded fastener connections 58 (FIG. 2) which are rigidly attached to the air bag, and which are threadably engaged by nuts 54. Air bag 9 is also secured to platform 16 by suitable fasteners 55 (FIG. 2D).

The prior art welded connection of front axle seat bracket 28F to beam first bottom plate 39 is subjected to high stresses during operation of the heavy-duty vehicle. These stresses can be especially pronounced for extreme-duty vehicles, such as those that are rated at or above 30,000 lbs. per axle. Under these conditions, the welded connection of front axle seat bracket 28F can potentially become compromised or weakened during vehicle operation, resulting in reduced durability of the axle seat bracket-to-beam connection and, in turn, reducing the durability of the axle-to-beam connection of axle/suspension system 10.

Having now described axle/suspension system 10 which includes overslung/top-mount beam 12, an axle/suspension system 10' which includes an underslung/bottom-mount beam 12' and which utilizes a prior art axle seat bracket-to-beam connection, will now be described immediately below.

Figure 3:
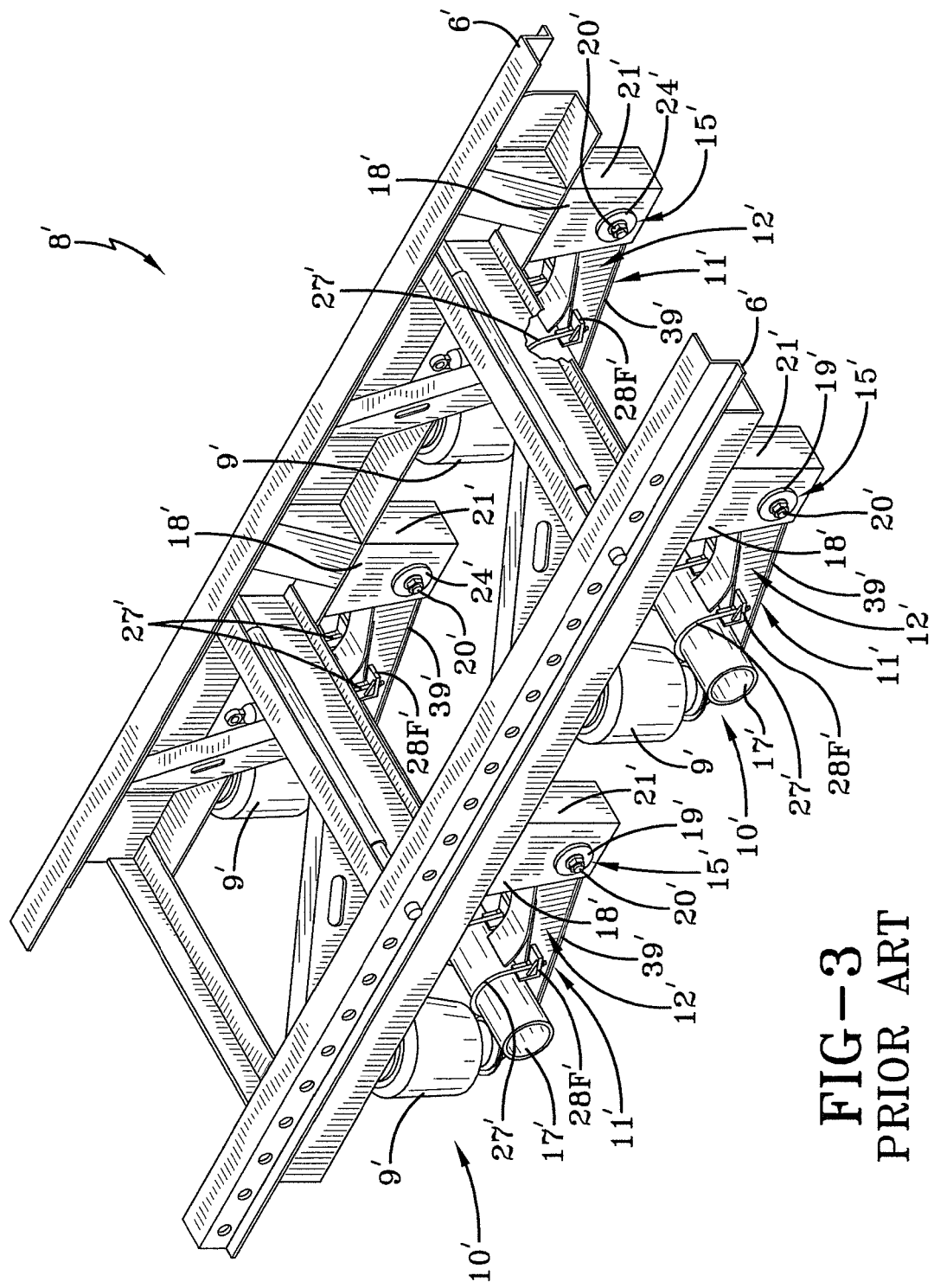
FIG. 3 is a top front curb-side perspective view of a slider box for a tractor-trailer incorporating a pair of prior art trailing arm air-ride beam-type axle/suspension systems, showing the underslung/bottom-mount beams of each axle/suspension system capturing the axle utilizing axle-to-beam connections including welds (not shown), U-bolts and axle seat brackets.

Turning now to FIG. 3, a pair of prior art air-ride trailing arm rigid underslung beam-type axle/suspension systems are indicated generally by reference numeral 10' and are shown incorporated into a slider box 8' for a tractor-trailer. Axle/suspension system 10' is also the subject of U.S. Pat. No. 5,037,126, is available from the assignee of the present invention, and is commercially sold as the HT Series Suspension System. Inasmuch as slider box 8' includes an identical pair of axle/suspension systems 10' mounted on the slider, only one of the axle/suspension systems will be described herein. Moreover, inasmuch as axle/suspension system 10' comprises an identical pair of suspension assemblies 11' mounted on a pair of transversely spaced frame hangers 18' depending from slider 8' for mounting an axle 17', only one of the suspension assemblies will be described herein.

Figure 4:
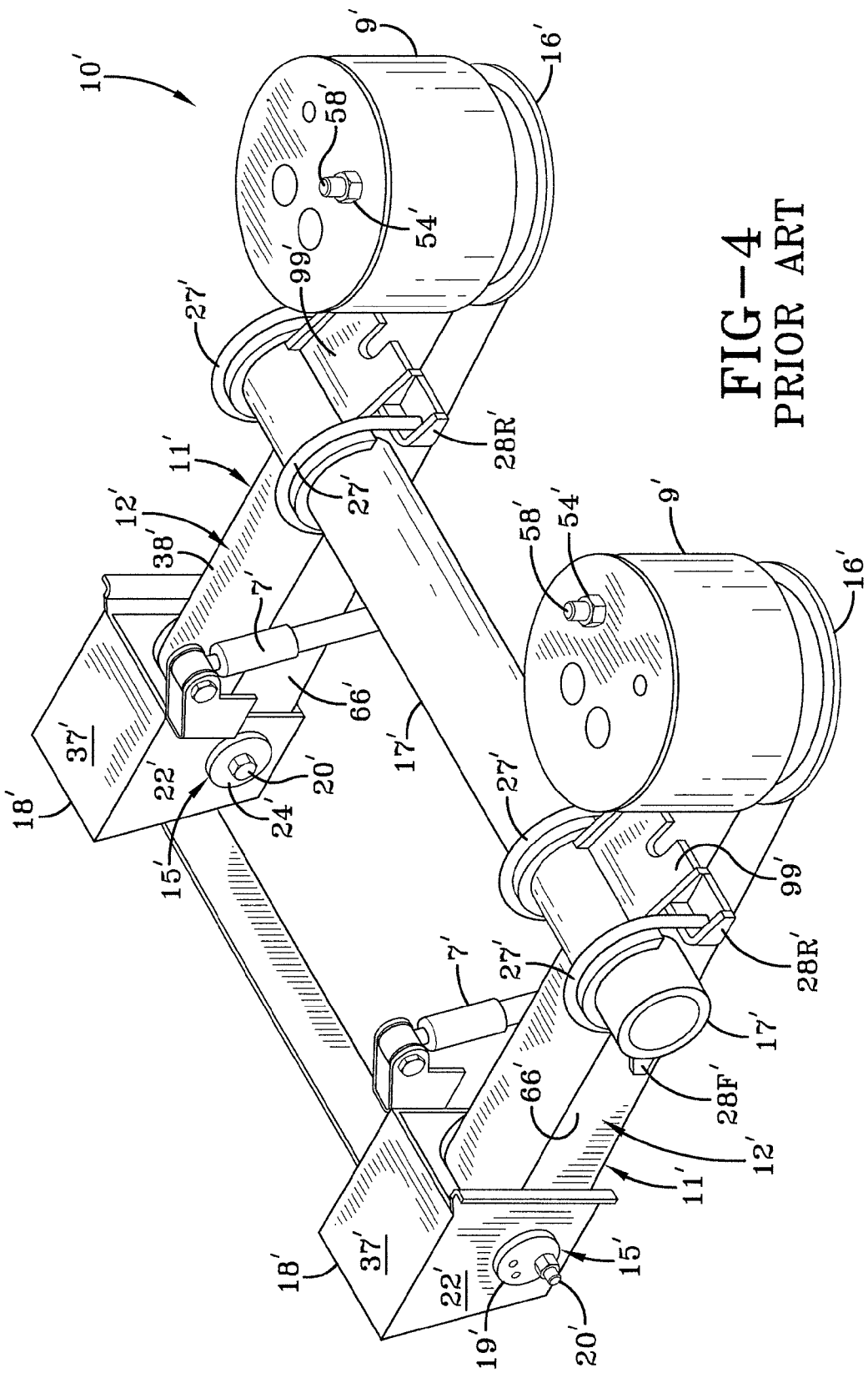
FIG. 4 is a top rear driver-side perspective view of one of the prior art axle/suspension systems shown in FIG. 3, pivotally attached to a pair of hangers, and showing each of the underslung/bottom-mount beams capturing the axle utilizing axle-to-beam connections including welds (not shown), U-bolts and axle seat brackets.
Figure 4A:
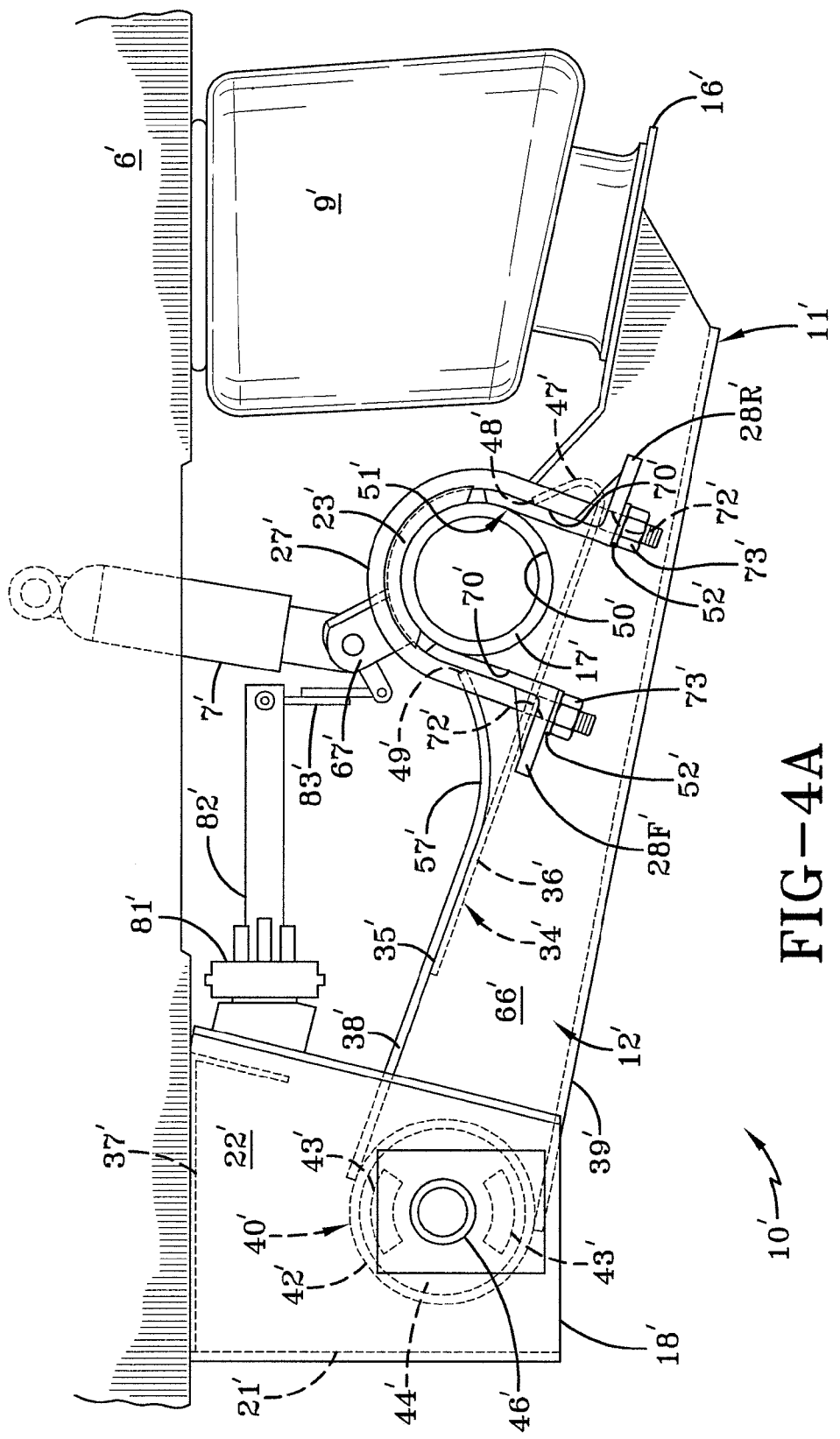
FIG. 4A is a fragmentary side elevational view, with hidden portions represented by broken lines, of the prior art axle/suspension system shown in FIG. 4, showing one of the pair of suspension assemblies mounted on a vehicle frame, and showing the underslung/bottom-mount beam connected to the axle utilizing axle-to-beam connections including welds (not shown), U-bolts, and axle seat brackets.

With additional reference to FIGS. 4 and 4A, suspension assembly 11' includes trailing arm or beam 12' which is a generally rigid metal box-like structure comprising a pair of transversely spaced vertically extending sidewalls 66', which are interconnected by horizontally extending top and bottom plates 38' and 39', respectively. Sidewalls 66' and bottom plate 39' are formed as a one-piece structure having a generally U-shape. Top plate 38' is welded to sidewalls 66' to complete the general structure of beam 12'. A more detailed description of beam 12' is set forth below. The front end of beam 12' includes a bushing assembly 40' of a type which is well known in the heavy-duty axle/suspension system art (FIG. 4A). Bushing assembly 40' includes a mounting tube 42' formed of robust steel and an elastomeric bushing 44' press fit into the tube. Bushing 44' is molded about and adhesively attached to a central metal sleeve 46' formed with a continuous opening 56'. Sleeve 46' passes completely through bushing 44' and extends outwardly from the sidewalls thereof for facilitating pivotal mounting of beam 12' on slider box 8', which will be described in greater detail hereinbelow. As is well known in the art, the durometer of elastomeric bushing 44' can be varied depending on the application and the bushing deflection properties desired. To generally achieve a softer ride in the vertical direction and a stiffer ride in the fore-aft direction, bushing 44' is formed with a pair of vertically-spaced voids 43' in each of its sidewalls.

A platform 16' extends from the rear end of trailing beam 12' for supporting a conventional bellows-type air spring 9', which extends between and is attached to platform 16' and a main member 6' of slider box 8' (FIGS. 3 and 4A). A shock absorber 7' also is attached to and extends between beam 12' and main member 6' of slider 8' at selected locations to complete the major components of suspension assembly 11'. Axle 17' extends between and is rigidly connected to the rear end of each beam 12' by welds (not shown) and structural components including a pair of U-bolts 27' and a pair of front and rear axle seat brackets 28F' and 28R', respectively, as will be described in greater detail below. Front and rear axle seat brackets 28F',R' are connected to inboard and outboard sidewalls 66' of beam 12' by conventional means well known in the art, such as welding. A rear angle plate 99' is attached to rear axle seat bracket 28R' and to sidewalls 66' of the rear portion of beam 12' (FIG. 4).

Suspension assembly beam 12' is pivotally mounted on main member 6' of slider box 8' via frame hanger 18' which depends from and is secured to the main member by any conventional means such as welds. Frame hanger 18' typically is a generally box-like sturdy steel structure having a vertically extending front wall 21' and a top wall 37' which are each attached to and extend between a pair of vertically extending sidewalls 22' (FIGS. 4-4A). A fastener assembly 15' includes a bolt 20' which passes through an eccentric washer 19' and a washer 24', with the eccentric washer being located adjacent the outboard surface of outboard sidewall 22' of hanger 18' and washer 24' being located adjacent the inboard surface of inboard sidewall 22' of the hanger, a pair of aligned openings (not shown) formed in hanger sidewalls 22', a pair of aligned openings formed in a pair of conventional spacer discs (not shown), and aligned continuous opening 56' of bushing sleeve 46'. Each spacer disc typically is formed of ultrahigh molecular weight polyethylene, and is disposed about bushing mounting tube 42' between a respective one of hanger sidewalls 22' and bushing 44', to insulate against metal-to-metal contact between the mounting tube and the hanger sidewalls. Eccentric washer 19' provides a means for adjusting alignment of axle/suspension system 10'.

Turning now to FIGS. 4 and 4A, beam 12' generally comprises seven component parts, including sidewalls 66', integral bottom plate 39', first top plate 38', a second top plate 36', and front and rear axle seat brackets 28F',R'. As set forth above, opposing sidewalls 66' and bottom plate 39' form a one-piece U-shaped member. This U-shaped member is formed by a stamping and/or bending process. First top plate 38' and second top plate 36' are secured together by welding along an adjacent interface 35' to form a rigid beam top member 34'. Beam top member 34' is rigidly secured to the open end of the U-shaped member, and along sidewalls 66' and, thus, opposite and spaced from bottom plate 39'.

Front and rear axle seat brackets 28F',R' nest in and are rigidly secured to a pair of grooves 70' formed in opposing sidewalls 66' of beam 12', by welding. An inverted arch 50' (only one shown) is formed in the upper edge of each of sidewalls 66' between grooves 70'. Second top plate 36' is formed with a bend 47' adjacent an end 48' opposite from the bushing assembly end of the plate. First top plate 38' is also formed with a bend 57' adjacent an end 49' opposite from the bushing assembly end of the plate. Terminal bent end 48' of second top plate 36' contacts and is rigidly secured to rear axle seat bracket 28R' by welding, while terminal bent end 49' of first top plate 38' contacts and is rigidly secured to front axle seat bracket 28F' by welding. The front axle seat bracket-to-beam connection can potentially be susceptible to weld fatigue and/or become compromised when operating under extreme-duty conditions, such as when the axle/suspension system is subjected to loads in excess of about 30,000 lbs/ axle, as will be described in more detail below. As can be seen, by bending first top plate 38' and second top plate 36' in a manner so that ends 49' and 48' are oriented in the general direction of axle 17' at substantially the same relative angles, an axle locus 51' (FIG. 4A) is formed between inverted arches 50' (only one shown) of sidewalls 66', brackets 28F',R' and ends 49' and 48' of first and second top plates 38' and 36', respectively.

Because the axle-to beam connection requires a pair of generally identical inboard and outboard connections for each suspension assembly 11', for purposes of clarity only the inboard connection of the suspension assembly will be described with the understanding that an identical outboard connection also exists for the same suspension assembly. A U-bolt spacer 23' is disposed between axle 17' and U-bolt 27'. U-bolt spacer 23' (FIG. 4A) is constructed such that it will contact an exposed upper portion of axle 17' and is disposed between the axle and U-bolt 27' to ensure a secure mating of the axle in locus 51'. U-bolt 27' is placed around axle 17' and U-bolt spacer 23' (FIG. 4A) and through a pair of openings 72' formed in axle seat brackets 28F',R'. Each one of a pair of washers 52' (FIG. 4A) is disposed over a respective one of the pair of ends of U-bolt 27' and each one of a pair of nuts 73' is threadably engaged with a respective one of the pair of threaded ends of the U-bolt, and tightened. U-bolts 27' and their associated hardware, in addition to the welds (not shown) disposed between axle seat bracket 28' and axle 17', secure the axle into axle locus 51' to create a rigid axle-to-beam connection.

With continued reference to FIG. 4A, a shock absorber pivot plate 67' is secured to one of axle seat brackets/axle seats 28' by suitable means (not shown). Shock absorber 7' is fastened to shock absorber pivot plate 67' such that the shock absorber pivots relative to beam 12'. A height control valve 81' is attached to hanger 18' and is operatively connected to shock absorber pivot plate 67', via a lever 82' and a link 83'. Air bag 9' is secured to main member 6' of slider box 8' by threaded fastener connections 58' (FIG. 4) which are rigidly attached to the air bag, and which are threadably engaged by nuts 54'. Air bag 9' is also secured to platform 16' by suitable fasteners (not shown).

The welded connection of front axle seat bracket 28F' to beam first top plate 38' is subjected to high stresses during operation of the heavy-duty vehicle. These stresses can be especially pronounced for extreme-duty vehicles, such as those that are rated at or above 30,000 lbs. per axle. Under these conditions, the welded connection of front axle seat bracket 28F' can potentially become compromised or weakened during vehicle operation, resulting in reduced durability of the axle seat bracket-to-beam connection and, in turn, reducing the durability of the axle-to-beam connection of axle/suspension system 10'.

These problems are solved by the improved axle seat bracket-to-beam connection for underslung and overslung beams of axle/suspension systems of the present invention, which will now be described in detail below.

Figure 5:
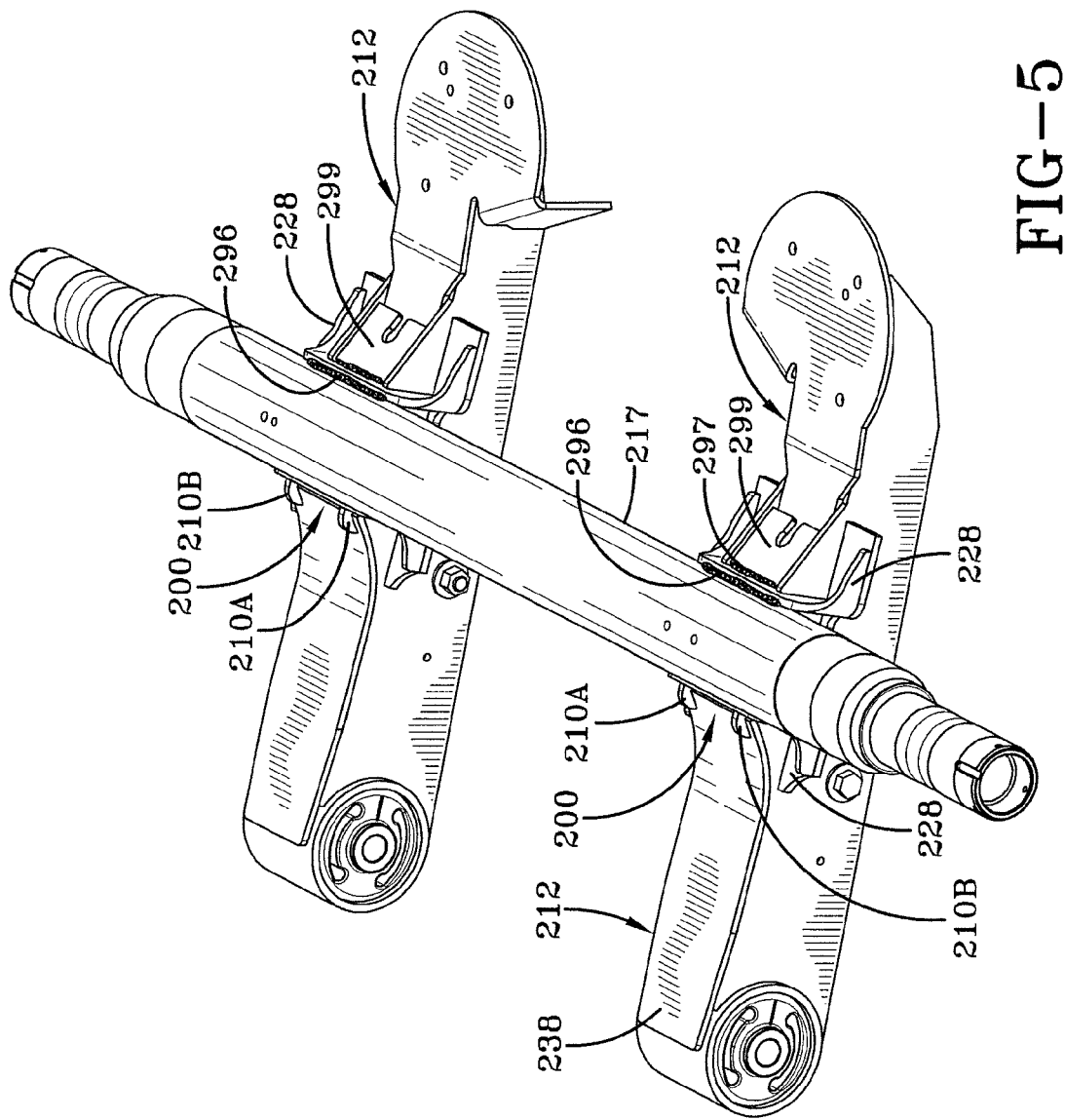
FIG. 5 is a top rear driver-side fragmentary perspective view of an axle and a pair of underslung beams of an axle/suspension system incorporating a preferred embodiment axle seat bracket to-beam connection of the present invention, showing the transversely-aligned spaced-apart weld stops located on the first top plate of each beam adjacent the front axle seat bracket.
Figure 6:
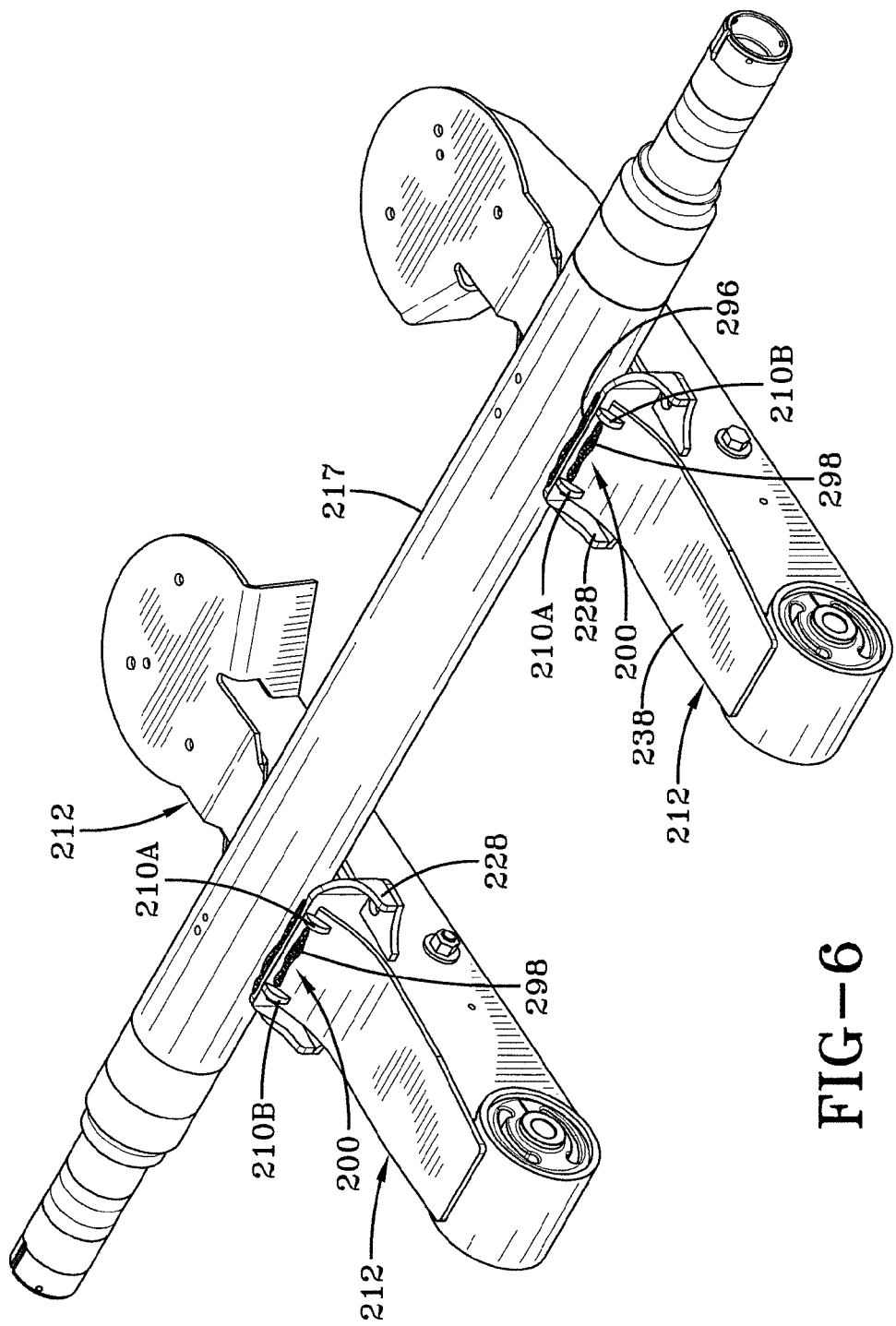
FIG. 6 is a top front driver-side fragmentary perspective view of the axle and the pair of underslung beams of an axle/suspension system shown in FIG. 5, showing the pairs of transversely-aligned spaced-apart weld stops located on their respective first top plates of the beams.

A preferred embodiment axle seat bracket-to-beam connection of the present invention is shown generally in FIGS. 5-6 at reference numeral 200, incorporated into a pair of bottom-mount/underslung beams 212 and an axle 217 of an axle/suspension system, and will be described in detail below.

Beam 212 is similar to prior art bottom-mount underslung beam 12' described above. With additional reference to FIGS. 7-15, and with particular reference to FIG. 10, beam 212 is a generally rigid metal box-like structure comprising a pair of transversely spaced vertically extending sidewalls 266, which are interconnected by horizontally extending top and bottom plates 238 and 239, respectively. Sidewalls 266 and bottom plate 239 are formed as a one-piece structure having a generally U-shape. Top plate 238 is welded to sidewalls 266 to complete the general structure of beam 212. The front end of beam 212 is formed with a mounting tube 242 through which a bushing assembly (not shown) of a type which is well known in the heavy-duty axle/suspension system art is disposed.

Figure 7:
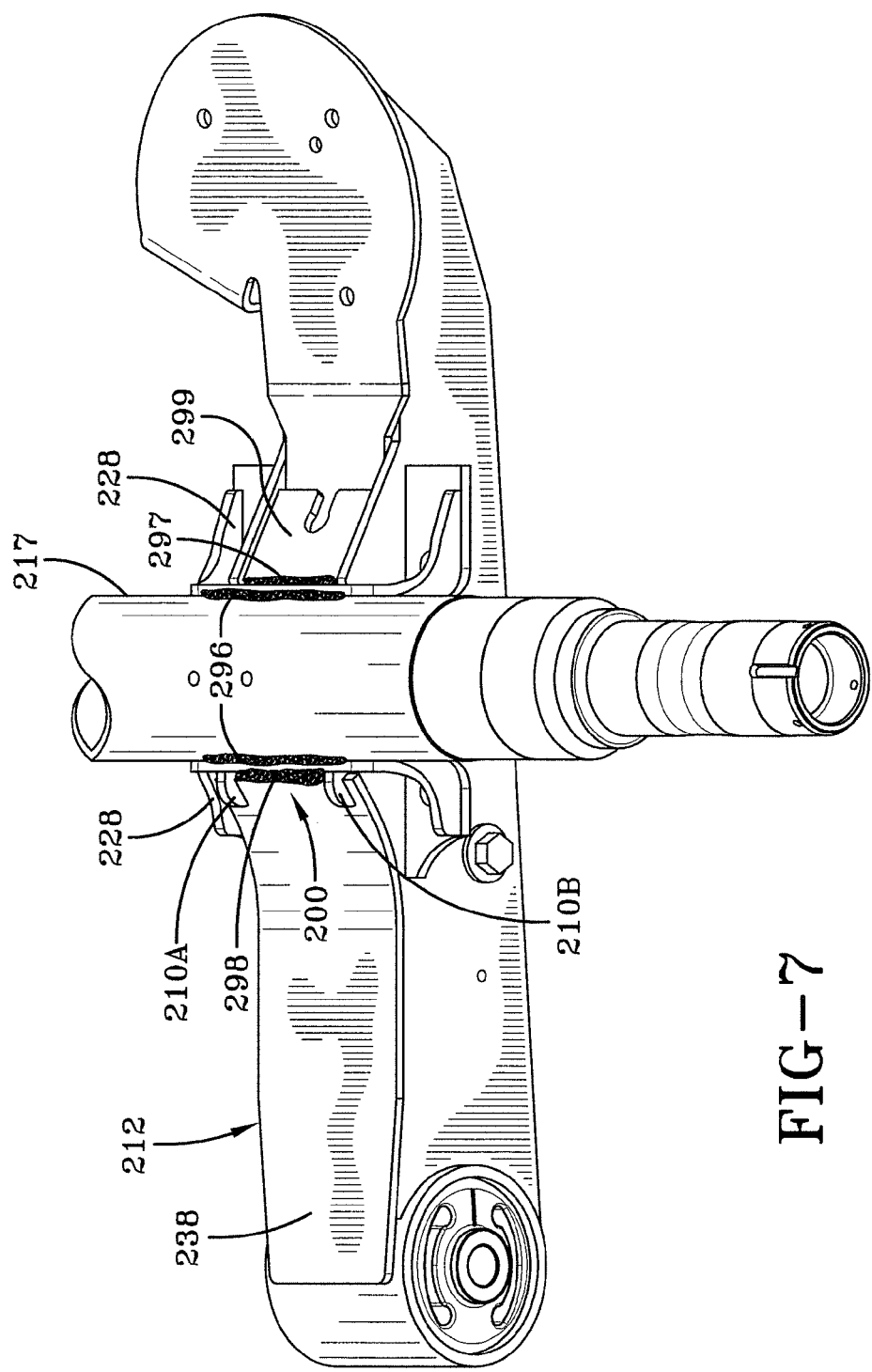
FIG. 7 is an enlarged top driver-side fragmentary perspective view of the axle and driver side beam shown in FIGS. 5 and 6, showing the pair of transversely-aligned spaced apart weld stops located on the first top plate of the beam.

A platform 216 extends from the rear end of trailing beam 212 for supporting a conventional bellows-type air spring (not shown), which extends between and is attached to the platform and a main member (not shown) of the vehicle. Axle 217 (FIG. 6) extends between and is rigidly connected to the rear end of each beam 212 by welds (not shown) and structural components including U-bolts 227 and axle seat brackets 228 (FIG. 9), as will be described in greater detail below. A rear angle plate 299 is attached to rear axle seat bracket 228 and to sidewalls 266 of the rear portion of beam 212 (FIG. 7).

With continuing reference to FIG. 10-14, beam 212 generally includes eight component parts, including sidewalls 266, integral bottom plate 239, first top plate 238, a second top plate 236, angled plate 299, and axle seat brackets 228. As set forth above, opposing sidewalls 266 and bottom plate 239 form a one-piece U-shaped member. This U-shaped member is formed by a stamping and/or bending process. First top plate 238 and second top plate 236 are secured together by welding along adjacent interface 235 (FIG. 12) to form a rigid beam top member 234. Beam top member 234 is rigidly secured to the open end of the U-shaped member, and along sidewalls 266 and, thus, opposite and spaced from bottom plate 239.

According to an important feature of the present invention, axle seat brackets 228 nest in and are rigidly secured to a pair of grooves 270 (FIG. 11) formed in opposing sidewalls 266 of beam 212, by welding, as will be described in detail below. An inverted arch 250 (only one shown) is formed in the upper edge of each of sidewalls 266 between grooves 270. First top plate 238 is formed with a bend 257 adjacent an end 249 opposite from the bushing assembly end of the plate. Angled plate 299 is attached to sidewalls 266 and to the rear end of axle seat bracket 228 and also to second top plate 236 by welding. As can be seen, by bending first top plate 238 and attaching angled plate 299 in a manner so that ends 249 and the end of the angled plate are oriented in the general direction of axle 217 at substantially the same relative angles, an axle locus 251 (FIG. 10) is formed between inverted arches 250 (only one shown) of sidewalls 266, and brackets 228.

Figure 8:
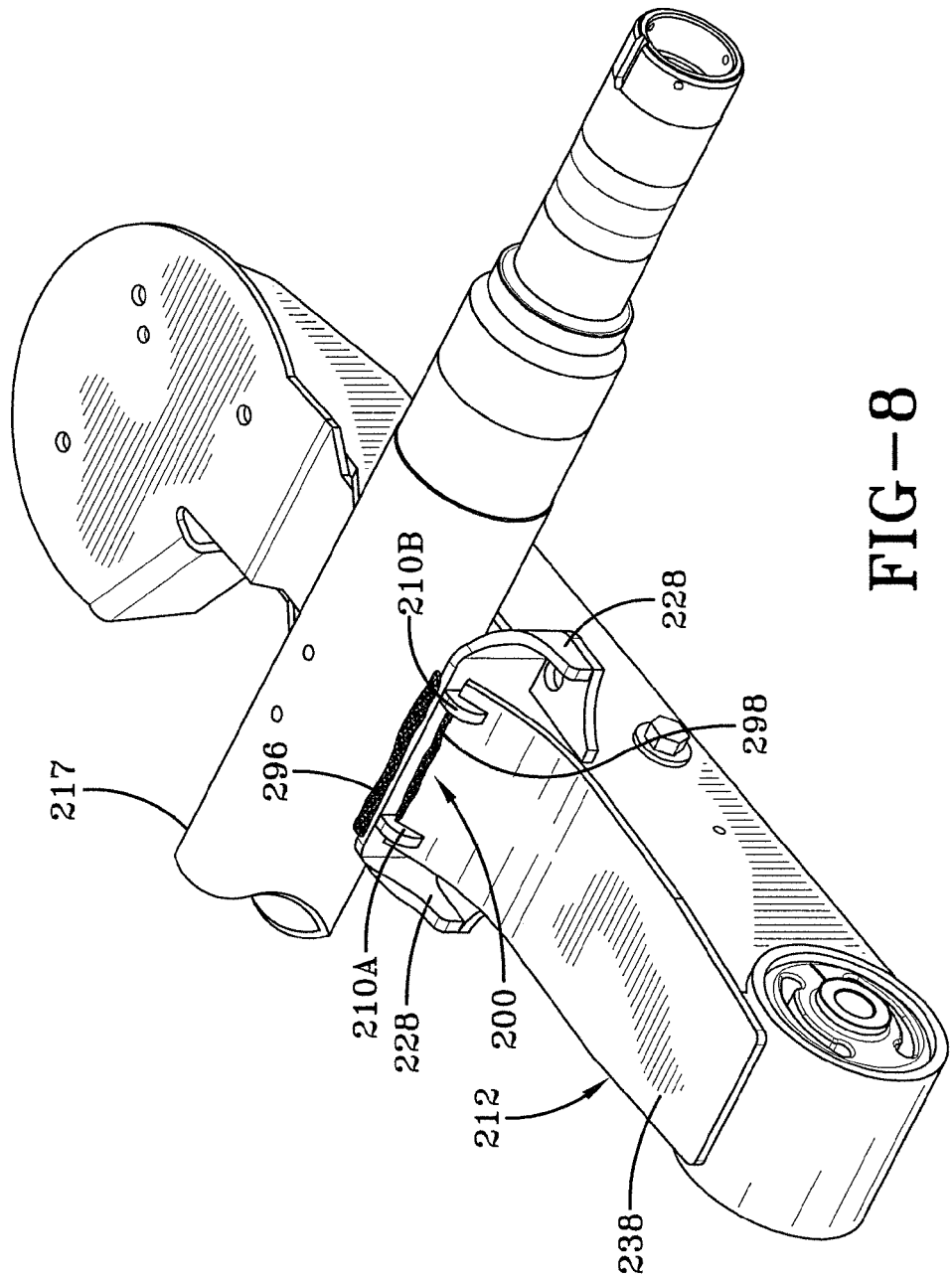
FIG. 8 is an enlarged top front driver-side fragmentary perspective view of the axle and driver side beam shown in FIG. 7.
Figure 9:
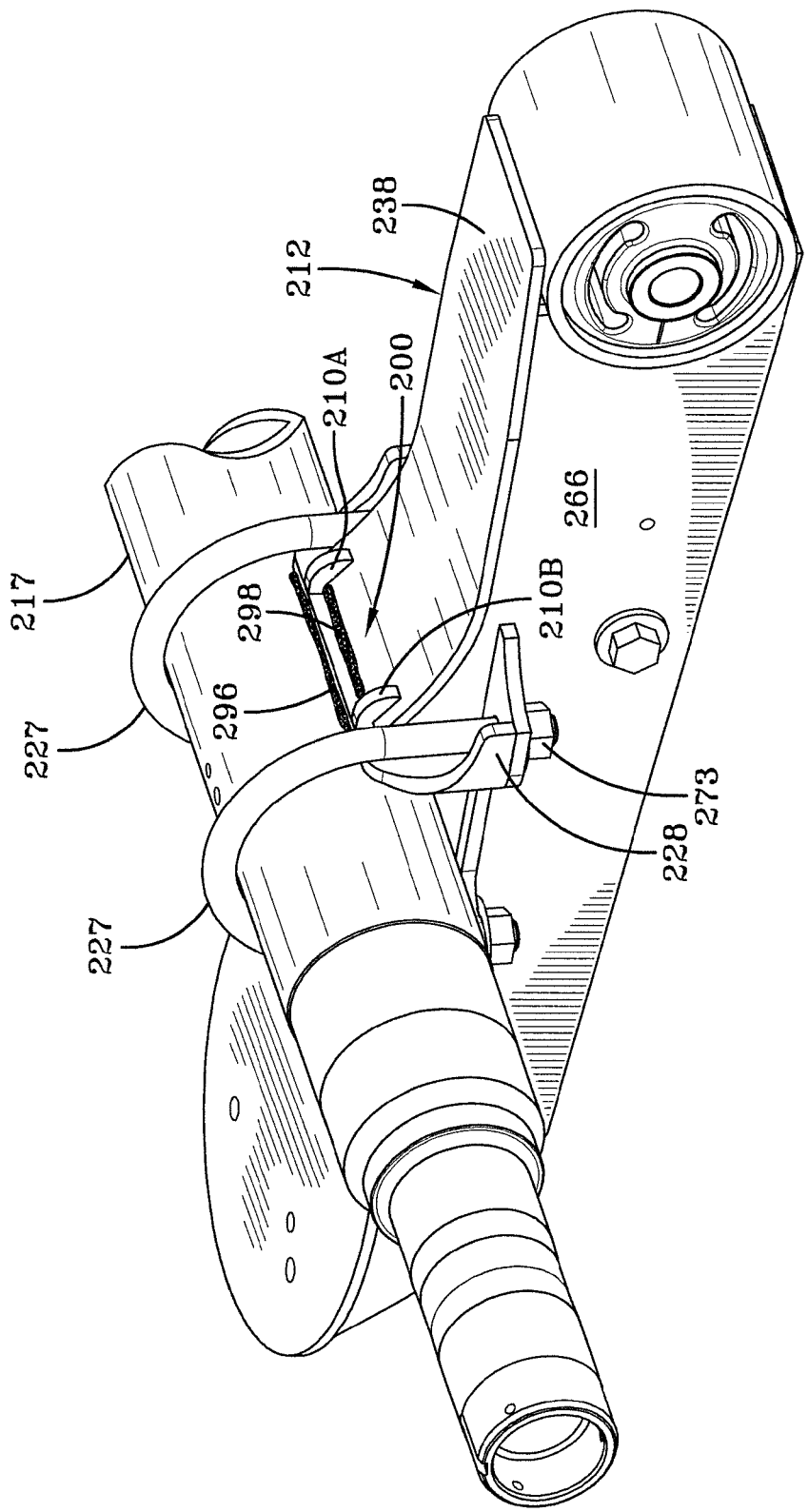
FIG. 9 is a top front curb-side fragmentary perspective view looking inboard of an axle/suspension system incorporating the preferred embodiment axle seat bracket-to-beam connection of the present invention, showing the transversely-aligned and spaced-apart weld stops adjacent the axle seat bracket and the U-bolts of the axle seat bracket-to-beam connection.
Figure 10:
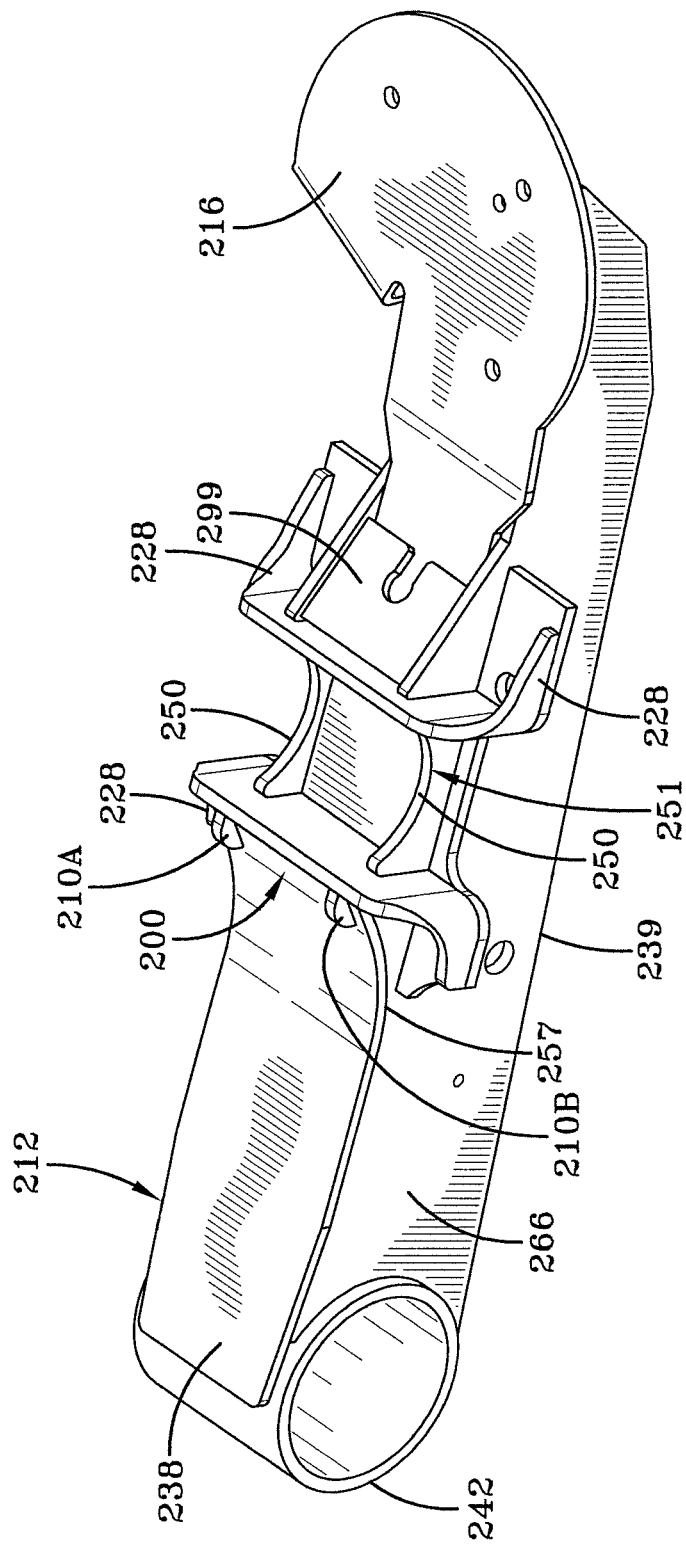
FIG. 10 is a top driver-side perspective view of the driver-side beam and axle seat bracket of an axle/suspension system incorporating the preferred embodiment axle seat bracket-to-beam connection of the present invention, showing the transversely-aligned and spaced apart weld stops adjacent the front of the axle seat bracket.
Figure 13:
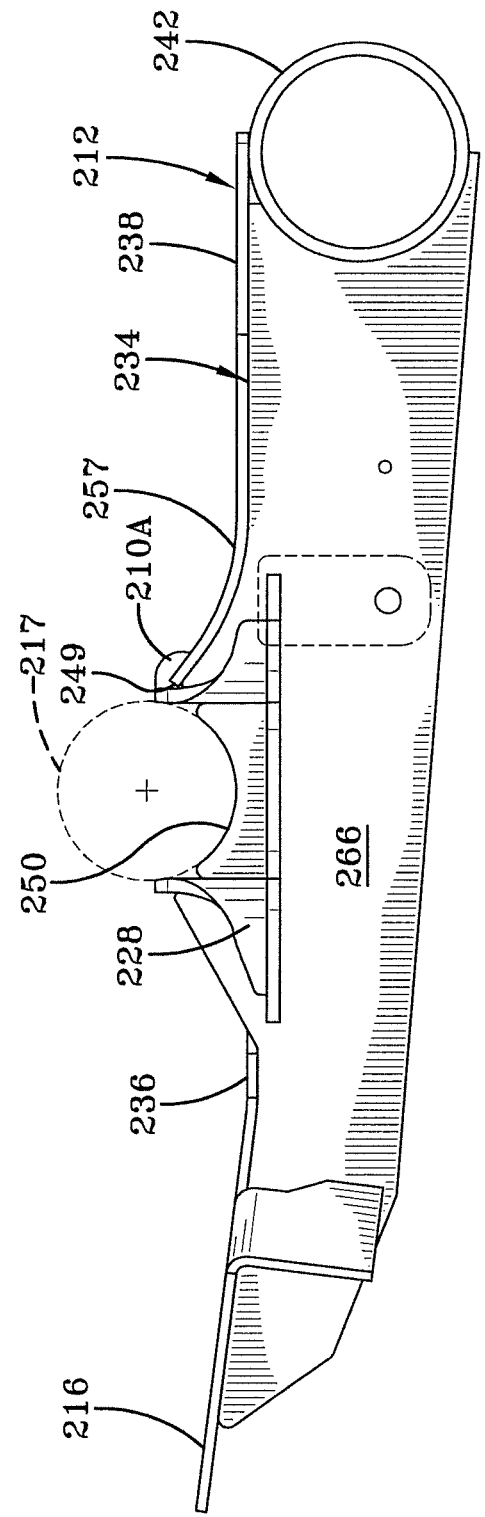
FIG. 13 is a side elevational view looking outboard of the beam shown in FIG. 10.

With particular reference to FIGS. 8-9 and 15, an important feature of preferred embodiment axle seat bracket-to-beam connection 200 of the present invention, are inboard and outboard weld stops 210A and 210B, respectively. Each weld stop 210A,B is formed from metal or other rigid material. Inboard and outboard weld stops 210A,B are transversely aligned and spaced-apart from one another and are rigidly attached to beam first top plate 238 in a manner well known in the art, such as by welding. Weld stops 210A,B each include a notch 211 (FIG. 15) formed adjacent the rear underside of the weld stop. Notch 211 is configured to cooperate with end 249 of top plate 238. Weld stops 210A,B also each include a generally flat rear vertical surface 208 that contacts the front surface of axle seat bracket 228. It is also contemplated that weld stops 210A,B could also be attached to bracket 228 and contact beam 212; or attached to the beam but not in contact with the bracket; or attached to the bracket but not in contact with the beam; or attached to the beam and the bracket both, without changing the overall concept or operation of the present invention. Weld stops 210A,B serve as a start point and end point for welds that are laid between beam first top plate 238 and axle seat bracket 228. In preferred embodiment axle seat bracket-to-beam connection 200, a three-pass weld is utilized in order to rigidly connect axle seat bracket 228 to beam first top plate 238.

Having now described the structure of axle seat bracket-to-beam connection 200 of the present invention, the assembly of the connection will now be described in detail below. As set forth above, axle seat bracket 228 is nested into groove 270 of beam sidewalls 266. Weld stops 210A,B are transversely spaced-apart from one another and attached to beam first top plate 238 by welds. Weld stops 210A,B are also generally parallel to one another and sidewalls 266 of beam 212. A three-pass weld 298 (FIG. 14) is laid along axle seat bracket 228 adjacent first top plate 238. More specifically, a first weld is laid starting at outboard weld stop 210B that extends along the front of axle seat bracket 228 and first top plate 238 to inboard weld stop 210A. A second weld is laid starting at inboard weld stop 210A that extends along axle seat bracket 228 and first top plate 238 to outboard weld stop 210B. A third weld is laid starting at outboard weld stop 210B that extends along axle seat bracket 228 and first top plate 238 to inboard weld stop 210A. In this manner, the front end of axle seat bracket 228 is securely attached to beam 212. An additional weld 297 is laid between angled plate 299 and the rear face of axle seat bracket 228. No welds stops are needed for the connection of the rear face of axle seat bracket 228 to angled plate 299 as sidewalls 266 of beam 212 serve as weld stops for the rear axle seat bracket-to-beam connection.

Following attachment of axle seat bracket 228 to beam 212, the axle-to-beam connection is completed in a manner similar to that described above with respect to the prior art axle-to-beam connections. More specifically, additional welds 296 are laid between axle seat bracket 228 and axle 217. Moreover, because the axle-to beam connection requires a pair of generally identical inboard and outboard connections for each suspension assembly 211, for purposes of clarity only the inboard connection of the suspension assembly will be described with the understanding that an identical outboard connection also exists for the same suspension assembly. U-bolt 227 is placed around axle 217 (FIG. 9) and through a pair of openings 272 (FIG. 14) formed in axle seat bracket 228. Each one of a pair of washers (not shown) is disposed over a respective one of the pair of ends of U-bolt 227 and each one of a pair of nuts 273 (FIG. 9) is threadably engaged with a respective one of the pair of threaded ends of the U-bolt, and tightened. U-bolts 227 and their associated hardware, in addition to welds 296 disposed between axle seat bracket 228 and axle 217, secure the axle into axle locus 251 to create a rigid axle-to-beam connection.

As set forth above, axle seat bracket-to-beam connection 200 of the present invention overcomes the problems associated with prior art front axle seat bracket-to-beam connections by providing a more robust front axle seat bracket-to-beam connection that utilizes weld stops 210, resulting in improved overall durability of the axle/suspension system. It is contemplated that preferred embodiment axle seat bracket-to-beam connection 200 of the present invention could be utilized on tractor-trailers or heavy-duty vehicles having one or more than one axle without changing the overall concept of the present invention. It is further contemplated that weld stops 210 could be formed from one-piece or multiple pieces of material connected to or spaced from one another, without changing the overall concept of the present invention. It is even further contemplated that axle seat bracket-to-beam connection 200 of the present invention could be utilized on vehicles having frames or subframes which are moveable or non-movable without changing the overall concept of the present invention. It is also contemplated that during the assembly of axle seat bracket-to-beam connection 200 of the present invention, other types and configurations of welds, including a single pass or multiple pass weld could be utilized without changing the overall concept or operation of the present invention. It is yet even further contemplated that weld stops 210 of axle seat bracket-to-beam connection 200 of the present invention could be attached by welds or other fastening means such as bolts, adhesives, and the like without changing the overall concept or operation of the present invention. It is even further contemplated that additional pairs of weld stops 210 could be utilized in conjunction with axle seat bracket-to-beam connection 200 of the present invention without changing the overall concept or operation of the present invention. It is also contemplated that axle seat bracket-to-beam connection 200 of the present invention could be utilized on all types of leading and/or trailing arm beam-type axle/suspension system designs known to those skilled in the art without changing the overall concept of the present invention. For example, the present invention finds application in beams or arms that are made of materials other than steel, such as aluminum, other metals, metal alloys, composites, and/or combinations thereof. The present invention also finds application in beams or arms with different designs and/or configurations than that shown above, such as solid beams, shell-type beams, truss structures, intersecting plates, spring beams and parallel plates. It is even further contemplated that weld stops 210 of preferred embodiment axle seat bracket-to-beam connection 200 of the present invention could be extended rearwardly longitudinally to contact axle 217 and to serve as a starting and end point for welds 296 that are laid between axle seat bracket 228 and axle 217, without changing the overall concept or operation of the present invention. It is also contemplated that axle seat bracket-to-beam connection 200 of the present invention could be utilized without U-bolts, without changing the overall concept or operation of the present invention.

Accordingly, the heavy-duty axle/suspension system of the present invention is simplified, provides an effective, safe, inexpensive and efficient structure and method which achieves all the enumerated objectives, provides for eliminating difficulties encountered with prior art heavy-duty axle/suspension systems, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the heavy-duty axle/suspension system is used and installed, the characteristics of the construction, arrangement and method steps, and the advantageous, new and useful results obtained; the new and useful structures, devices, elements, arrangements, process, parts and combinations are set forth in the appended claims.

What is claimed is:
1. An axle seat bracket-to-beam connection for a heavy-duty axle/suspension system comprising:
    at least a pair of spaced apart weld stops, each one of said weld stops attached to at least one of a beam or an axle seat bracket of a suspension assembly of said axle/sus- pension system, and a weld disposed along an interface between said axle seat bracket and said beam between said pair of weld stops.

2. The axle seat bracket-to-beam connection for a heavy-duty axle/suspension system of claim 1, wherein said weld is a multi-pass weld.

3. The axle seat bracket-to-beam connection for a heavy-duty axle/suspension system of claim 1, wherein said weld stops are formed from metal.

4. The axle seat bracket-to-beam connection for a heavy-duty axle/suspension system of claim 1, wherein each one of said weld stops further comprises a notch adjacent the rear underside of the weld stop for communicating with said beam of said axle/suspension system.

5. The axle seat bracket-to-beam connection for a heavy-duty axle/suspension system of claim 1, wherein each one of said weld stops further comprises a generally flat vertical surface for contacting said axle seat bracket.

6. The axle seat bracket-to-beam connection for a heavy-duty axle/suspension system of claim 1, wherein said weld is a three-pass weld.

7. The axle seat bracket-to-beam connection for a heavy-duty axle/suspension system of claim 1, said axle seat bracket further comprising a pair of U-bolts.

8. The axle seat bracket-to-beam connection for a heavy-duty axle/suspension system of claim 1, said axle seat bracket being nested into a groove foamed in said beam.

9. The axle seat bracket-to-beam connection for a heavy-duty axle/suspension system of claim 1, wherein said pair of weld stops are located transversely from one another.

10. The axle seat bracket-to-beam connection for a heavy-duty axle/suspension system of claim 1, said beam comprising an overslung configuration.

11. The axle seat bracket-to-beam connection for a heavy-duty axle/suspension system of claim 1, said beam comprising an underslung configuration.

* * * * *

UNITED STATES PATENT AND TRADEMARK OFFICE
CERTIFICATE OF CORRECTION

PATENT NO.       : 8,764,038 B2                                    Page 1 of 1
APPLICATION NO.  : 14/027702
DATED            : July 1, 2014
INVENTOR(S)      : Daniel J. Piehl and Kevin J. Erdmann It is certified that error appears in the above-identified patent and that said Letters Patent is hereby corrected as shown below:

In the Claims

Claim 8, Column 14, line 9: delete the word "foamed" and insert therefor the word --formed--.

Signed and Sealed this
Twenty-third Day of September, 2014

Michelle K. Lee
*Deputy Director of the United States Patent and Trademark Office*